US009292731B2

(12) United States Patent
Carrizo et al.

(10) Patent No.: US 9,292,731 B2
(45) Date of Patent: Mar. 22, 2016

(54) GESTURE-BASED SIGNATURE AUTHENTICATION

(75) Inventors: Carlos Carrizo, Cordova (AR); Claudio Ochoa, Cordova (AR); Lucas Massuh, Cordova (AR)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 12/655,380

(22) Filed: Dec. 30, 2009

(65) Prior Publication Data

US 2011/0156867 A1 Jun. 30, 2011

(51) Int. Cl.
| | |
|---|---|
| *G05B 19/00* | (2006.01) |
| *G06F 3/033* | (2013.01) |
| *G06F 3/041* | (2006.01) |
| *G06K 9/00* | (2006.01) |
| *G07C 9/00* | (2006.01) |
| *H04W 12/06* | (2009.01) |
| *H04L 29/06* | (2006.01) |
| *H04W 88/02* | (2009.01) |

(52) U.S. Cl.
CPC ........ *G06K 9/00167* (2013.01); *G06K 9/00335* (2013.01); *G07C 9/0015* (2013.01); *G07C 9/00158* (2013.01); *H04W 12/06* (2013.01); *G07C 2209/14* (2013.01); *H04L 63/083* (2013.01); *H04W 88/02* (2013.01)

(58) Field of Classification Search
CPC .................................................. G05B 19/00
USPC ....................................................... 340/5.85
See application file for complete search history.

(56) References Cited

U.S. PATENT DOCUMENTS

| 7,173,604 | B2 * | 2/2007 | Marvit et al. ................. 345/156 |
| 8,151,344 | B1 * | 4/2012 | Channakeshava ............. 726/19 |
| 8,436,821 | B1 * | 5/2013 | Plichta et al. ................. 345/173 |
| 8,638,939 | B1 * | 1/2014 | Casey et al. ................... 380/277 |
| 2007/0041058 | A1 | 2/2007 | Disatnik et al. |
| 2010/0131294 | A1 * | 5/2010 | Venon et al. ..................... 705/3 |

FOREIGN PATENT DOCUMENTS

| CN | 101251884 A | 8/2008 |
| CN | 101329600 A | 12/2008 |

(Continued)

OTHER PUBLICATIONS

Humm et al., "Combined Handwriting and Speech Modalities for User Authentication", IEEE Transactions on Systems, Man and Cybernetics-Part A: Systems and Humans, vol. 39, No. 1, Jan. 1, 2009, pp. 25-35.

(Continued)

*Primary Examiner* — Jennifer Mehmood
*Assistant Examiner* — John Mortell
(74) *Attorney, Agent, or Firm* — Trop, Pruner & Hu, P.C.

(57) ABSTRACT

Embodiments of the invention are generally directed to systems, methods, devices, and machine-readable mediums for implementing gesture-based signature authentication. In one embodiment, a method may involve recording a first gesture-based signature and storing the recorded first gesture-based signature. Then the method compares the first gesture-based signature with a second gesture-based signature. Then the method verifies the first gesture-based signature as authentic when the first gesture-based signature is substantially similar to the second gesture-based signature.

23 Claims, 5 Drawing Sheets

(56) References Cited

FOREIGN PATENT DOCUMENTS

| CN | 101339489 A | 1/2009 |
| CN | 101408822 A | 4/2009 |
| CN | 101408832 A | 4/2009 |
| EP | 1962280 A1 | 8/2008 |
| WO | 2009/026337 A1 | 2/2009 |

OTHER PUBLICATIONS

Oorschot et al., "Two Step: An Authentication Method Combining Text and Graphical Passwords", MCETECH 2009: 4th International MCETECH Conference on E Technologies, vol. 26, 2009, 6 pages.

European Search Report Received for EP Patent Application No. 10252199.4, Mailed on Nov. 14, 2012, 5 pages.

Office Action received for Chinese Patent Application No. 201010625006.X, mailed on Apr. 4, 2013, 5 pages of Chinese office action and 5 pages of English translation.

Office Action received for European Patent Application No. 10252199.4, mailed on Dec. 5, 2012, 6 pages of office action.

Office Action received for Chinese Patent Application No. 201010625006.X, mailed on Sep. 5, 2014, 13 pages of Chinese office action and 19 pages of English translation.

Office Action received for Chinese Patent Application No. 201010625006.X, mailed on Mar. 17, 2015, 14 pages of Chinese office action and 21 pages of English translation.

Office Action received for European Patent Application No. 10252199.4, mailed on Nov. 11, 2014, 6 pages of office action.

China Patent Office, Decision of Rejection mailed Oct. 10, 2015 in Chinese Patent Application No. 201010625006.X.

\* cited by examiner

GESTURE-BASED SIGNATURE AUTHENTICATION

TECHNICAL FIELD

Embodiments of the invention generally relate to the field of integrated circuits and, more particularly, to systems, methods, devices, and machine-readable mediums for gesture-based signature authentication.

BACKGROUND

There are a number of software applications that require authentication. For example, many e-commerce, home banking, and network access applications need authentication to provide the user a level of security. In most cases the need for authentication is addressed by requiring the user to enter a text-based password or passphrase. Text-based passwords, and especially passphrases, are more difficult to input when using a small mobile devices. The use of passwords and passphrases are restricted to the availability of suitable keyboards. Additionally, text-based passwords and passphrases can be easily compromised when a malicious user determines the correct password or passphrase.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments are generally directed to systems, methods, and apparatuses for implementing gesture-based signature authentication.

In many embodiments, a process to use a combination of gestures including glyphs entered in a touch screen (which may include single touch or multi-touch capable touch screens), sounds captured by a microphone, and movements registered by motion sensors may be used in place of a standard text-based password for use with a mobile computing device. The term "gesture" will be applied to any user entered combination of glyphs, movements and sounds that the user enters into the mobile computing device through input devices. A gesture-based signature can be verified as performed by the authentic user (i.e., authenticated) through a series of calculations. Once the gesture-based signature has been authenticated, the gesture-based signature can be substituted for a correct text-based password that is then input into a password field to gain access to a software application or website. Logic to perform gesture identification, comparison, and verification processes may be present within the mobile computing device. This process does not require significant changes to application or website infrastructure.

Figure 1:
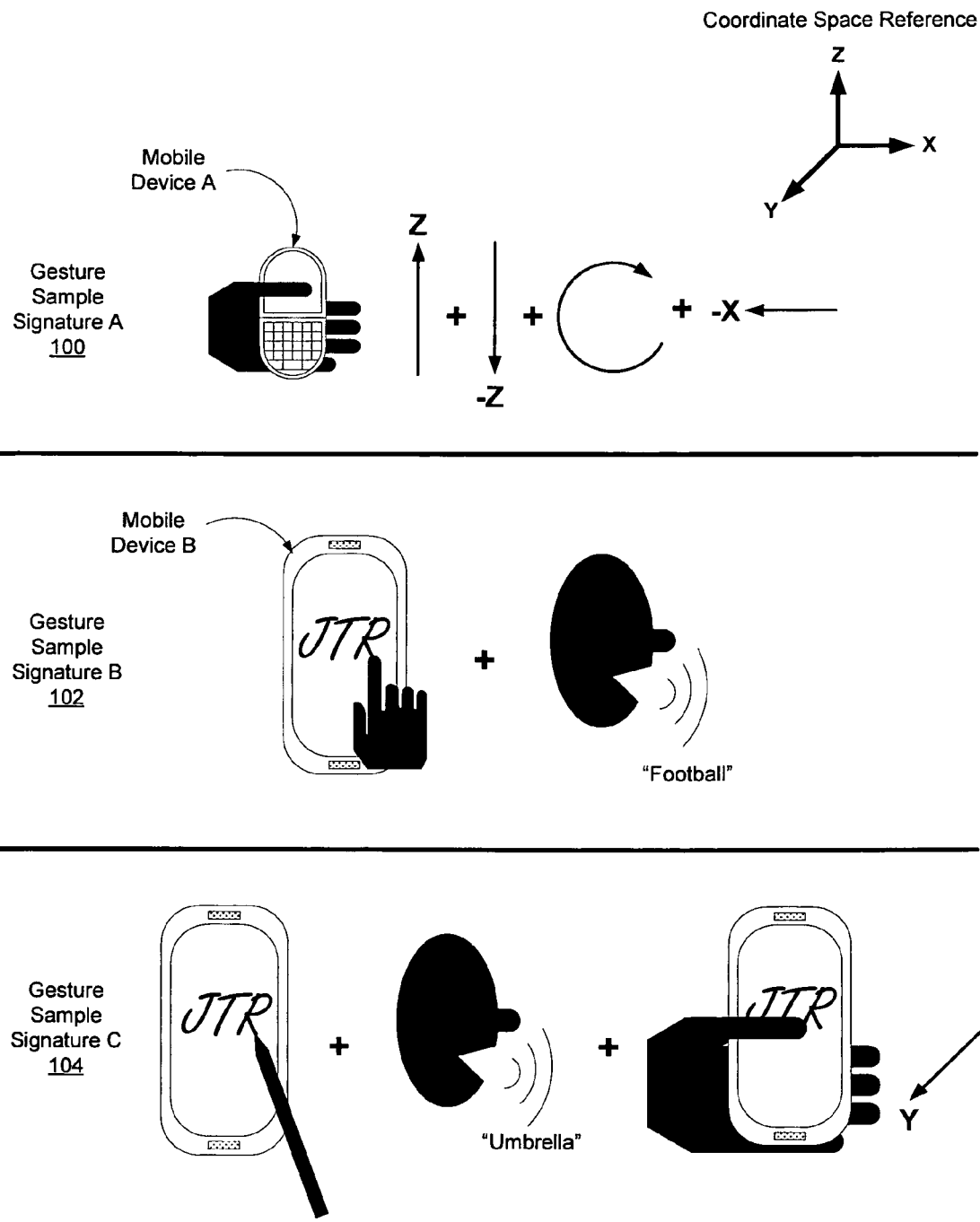
FIG. 1 illustrates several examples of motion gestures that may be utilized as gesture-based signatures.

FIG. 1 illustrates several examples of motion gestures that may be utilized as gesture-based signatures.

Each of the samples involves a user holding the mobile computing device A and making a series of movements in three-dimensional space. In order for these movements to be recognized, mobile device A needs an integrated motion sensor device (e.g., an accelerometer).

A coordinate space reference at the top of the page illustrates the positive X, Y, and Z directions in three-dimensional space. Based on that reference, we now turn to gesture sample signature A 100, which shows the mobile device A first moving in the positive Z direction, then the negative Z direction, then a clockwise circle, and finally, the negative X direction. This description is rudimentary for ease of explanation. In a real example, a user's hand is generally not going to only travel back and forth along an axis in three-dimensional space.

Rather, in a true example of motion capture in three-dimensional space, a buffer will be created to store X, Y, Z coordinate triplets in 3D space. The coordinate triplets will be stored at the end of a time interval since the previous coordinate triplet was acquired. For example, mobile device A may store a coordinate triplet of the current location of the mobile device A in 3D space every 0.001 seconds. This would create a histogram in 3D space of the location of the mobile device at a 0.001 second granularity. In other embodiments, the interval granularity may be shorter or longer.

In many embodiments, a user presses a button on the mobile device to begin capture of the signature. Once the button is pressed, the 3D coordinates at the current location of the device may be zeroed out as a relative reference point. Then the coordinate capture begins upon pressing the button and the coordinate triplets are continuously stored until a button is pressed again by the user to indicate that the gesture-based signature is complete.

Gesture sample signature B 102 utilizes mobile device B, which includes a touch screen display. The touch screen display may be utilized to capture a glyph. In some embodiments, a user may use their hand as the input instrument on the touch screen. In other embodiments, the user may use a pen or other pointing device as the input instrument on the touch screen. In different embodiments the glyph may be any combination of movements captured by the touch screen. The combination of movements may resemble a collection of letters or symbols. Although, any combination of movements is acceptable so even seemingly random movements that do not resemble letters or symbols may be captured as the glyph, such as a handwritten signature.

Glyph capture may resemble the 3D space motion capture where a buffer may be created that stores X, Y coordinate doubles. These X, Y coordinate doubles may then be saved into the buffer once every time interval, which creates a time-based memory of how the glyph was created on the touch screen.

Furthermore, the mobile devices each include a microphone (e.g., the audio receiver in a cell phone). A word or phrase may be spoken into the microphone and saved as an audio frequency pattern over time in a buffer in the mobile device.

Returning to gesture sample signature B 102, the user may enter a glyph on the touch screen and then speak a word (e.g., "football") into the microphone on the mobile device as a combination of a glyph and audio gesture-based signature. Gesture sample signature C 104 illustrates a gesture-based signature utilizing all three types of input methods. For example, the user may enter a glyph on the touch screen, then speak a phrase into the microphone on the mobile device (e.g., "Umbrella"), and then move the mobile device in 3D space.

In many embodiments, two or more types of gestures may be simultaneously entered as a more advanced requirement for the gesture-based signature. For example, in gesture sample signature C 104, the user might first enter the glyph, but then speak the phrase and move the device in 3D space simultaneously. In many embodiments, a user may press a start gesture capture sequence button on the mobile device indicating the start of the sequence. At the start of the gesture capture sequence the glyph capture buffer, audio capture buffer, and 3D movement buffer are each initialized. Then the three buffers are utilized simultaneously to capture all three types of gestures (i.e., glyph, voice, and 3D movement) throughout the entire length of the gesture capture sequence. The gesture capture sequence ends as soon as an end capture sequence button is pressed on the mobile device.

Figure 2:
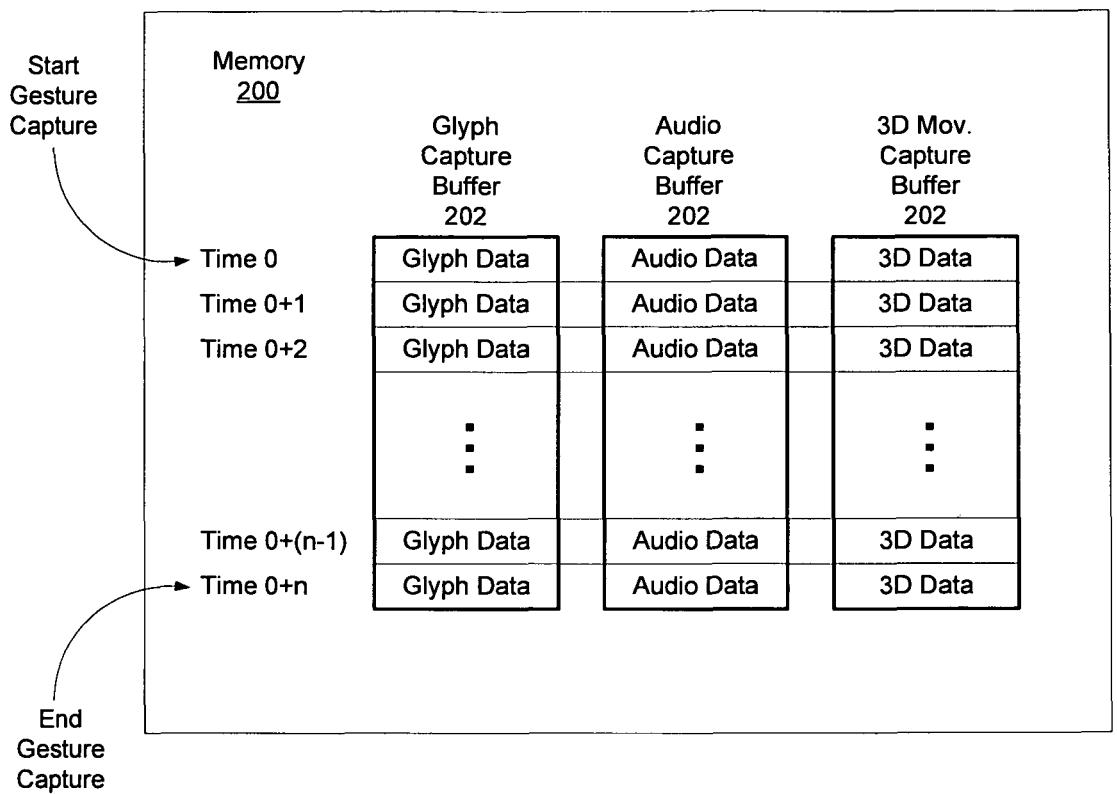
FIG. 2 illustrates an embodiment of the glyph capture buffer, audio capture buffer, and 3D movement buffer in memory.

FIG. 2 illustrates an embodiment of the glyph capture buffer, audio capture buffer, and 3D movement buffer in memory.

In many embodiments, memory 200 includes each of a glyph capture buffer 202, an audio capture buffer 204, and 3D movement buffer 206. These buffers are initialized at the start of a gesture capture sequence. In many embodiments, these buffers line up by acquisition times, as shown by the time column to the left of the buffers. For example, if Time 0 represents the start of a gesture capture period and there are n capture intervals, then Time 0+n intervals is the end of the gesture capture period. Each time interval has a saved amount of glyph data (X,Y coordinates), audio data (instantaneous frequency map of the audible spectrum as captured by the microphone), and 3D location data (X,Y,Z coordinates) in the respective buffers.

Once the capture period has completed, the buffers may be saved to a gesture-based signature file and stored in a storage location. In many embodiments, the storage location of the gesture-based signature file may be secured through the use of hardware or software-based security measures (e.g., signed public and private security keys, hash algorithms, hardware measurement techniques, etc.). In other embodiments, storage location may be a remote server using a secure channel, for connected comparison and use of the signature.

In order to harden the password, several variables are taken into account, including the timing and the way in which a glyph is drawn on the screen, the time speed at which a phrase is spoken in relation to the drawing of the glyph, the frequency of the user voice, etc. By taking all these points of data into account, even if the spoken phrase and the handwritten signature are compromised, it remains difficult to forge the gesture-based signature. Using a basic example of utilizing time as a factor in the comparison of two gesture-based signatures, a relative temporal (i.e., time) element may be introduced for the entire capture period length. In other words, the length of time it takes to fully record two separate attempts at the same gesture-based signature may need to be within a predetermined maximum discrepancy of time when comparing the two signatures. So if a first signature very nearly duplicates the coordinates of a second signature, but the first signature takes twice as long to complete, this may cause comparison logic to result with a "no match."

There are two general phases associated with gesture-based signature authentication. The first phase is the registration phase, which deals with generating a new gesture and safely storing it into the mobile device. The new gesture may require a training period where the user becomes familiar with the gesture and can substantially repeat the gesture combination desired as the password. Once the user has become confident that he or she can successfully repeatedly enter the full gesture without a substantial chance of having gesture comparison logic reject the gesture due to discrepancies, the gesture signature file may then be stored for future use.

In many embodiments, gesture identification and comparison logic within the mobile device will have the user enter the gesture-based signature several times and average out the coordinate, audio, and time data stored in the buffers during each capture period. Additionally, the variability of the user's ability to recreate the gesture-based signature may cause a maximum discrepancy threshold to increase or decrease. The maximum discrepancy threshold may be a discrepancy per time interval between the averaged coordinate and audio data and the most recently captured coordinate and audio data. For example, if the observed glyph coordinate data between several capture period training attempts varies widely, the gesture comparison and verification logic may allow a greater variability in the X,Y glyph data when determining the authenticity of the signature most recently recorded and a stored version of the signature.

Glyph and 3D movement gestures are represented by a finite list of one or more (for multi-touch devices) coordinates and their corresponding acquisition times. This makes a handwritten glyph-based and/or 3D movement-based signature harder to forge, since time-based coordinate information is stored, which reveals the way the signature is drawn on the touch screen or in the air, as well as the speed at which each stroke is usually performed.

In many embodiments, the gesture-based signature file is stored as a list of tuples of the form (input device, input value, acquisition time), for example ((touch screen); (8,33); 0).

Each registered gesture-based signature may be associated with a given application or website. Therefore, additional information is requested from the user, including the site/application, username, and text-based password if the user already possesses such password. If the user does not already possess such a password, then the text-based password can be automatically generated in this phase. This text-based password information is stored in a safe storage location.

Figure 3:
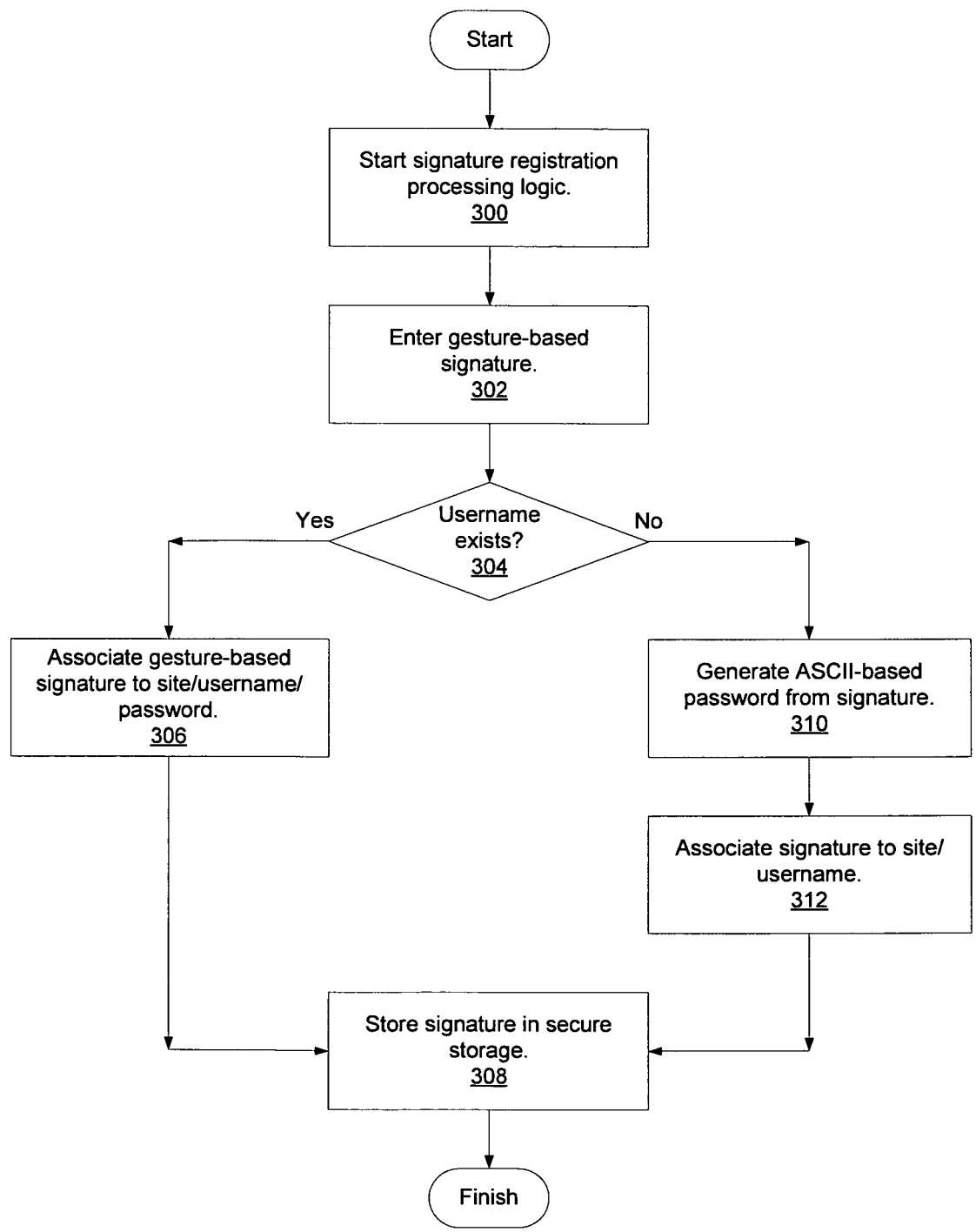
FIG. 3 is a flow diagram of an embodiment of a gesture-based signature registration phase.

FIG. 3 is a flow diagram of an embodiment of a gesture-based signature registration phase.

The process is performed by processing logic, which may comprise hardware (e.g., circuitry), software (e.g., an operating system or application), firmware (e.g., microcode), or any combination of two or more of the listed types of processing logic.

The process begins with a user starting the signature registration processing logic to register a gesture-based signature (processing block 300). Next, a user enters a gesture-based signature into the processing logic (processing block 302). In many embodiments, block 302 is performed several times until the entry has been sufficiently learned by the processing logic, including the variability levels of each type of gesture the user makes for the signature being registered.

Processing logic then determines if a username exists for user at the application or website that the user wants to implement a gesture-based signature for (processing block 304). If the username exists, then processing logic associates the gesture-based signature to the website/application, the username, and the password. The ASCII-based (i.e., text-based) password will correspond to the gesture-based signature. For example, if a user wants to log in to a website that requires a username and password, processing logic first associates a valid text-based username and password for the user to gain access to the website. Once the valid text-based username and password have been discovered, processing logic may associate this information with a particular gesture-based signature file. Processing logic then stores the gesture-based signature in a secure storage location (processing block 308).

Returning to block 304, if the username does not exist for the application or website, then processing logic generates an ASCII-based password from the signature (processing block 310) and then associates the gesture-based signature to the website/application and username (processing block 312). Finally, processing logic then stores the gesture-based signature in a secure storage location (processing block 308).

The authentication phase deals with the moment when the signature is being compared with the registered one for authentication purposes. Specifically, the process to authenticate a user proceeds as follows. An application or website requires the user to enter his/her username and password. The application/website developer uses a provided API (application programming interface) that will launch a graphical interface asking the user to enter a gesture-based signature.

The user then enters a gesture-based signature. The gesture-based signature entered by the user is then compared to the registered signature for that site/application. Since no two signatures from the same user are likely to be identical, algorithms that take into account variability, as mentioned above, may be used to compare the registered gesture-based signature with the newly entered gesture-based signature. Signatures that are compared would be required to be substantially similar in regard to time, coordinates, and voice frequencies. Just how similar would be signature specific, considering the variability per signature may differ depending on how well a user can repeat the signature during initial training capture periods. In some embodiments, a process described as Dynamic Type Warping may be utilized. Dynamic Type Warping performs point-to-point correspondence for data at each acquisition time. A smart selection of acquisition points may then be compared.

In some embodiments, the gesture-based signature comparison processing logic may be offloaded to a backend server coupled to a network that the mobile computing device is also coupled to. In many embodiments that utilize a backend server for comparison of the two signatures, the registered signature may be stored at the backend server.

Once the newly-entered gesture-based signature is matched to a registered signature, the associated text-based password is returned to the external application/website, which then permits the user to log in.

Figure 4:
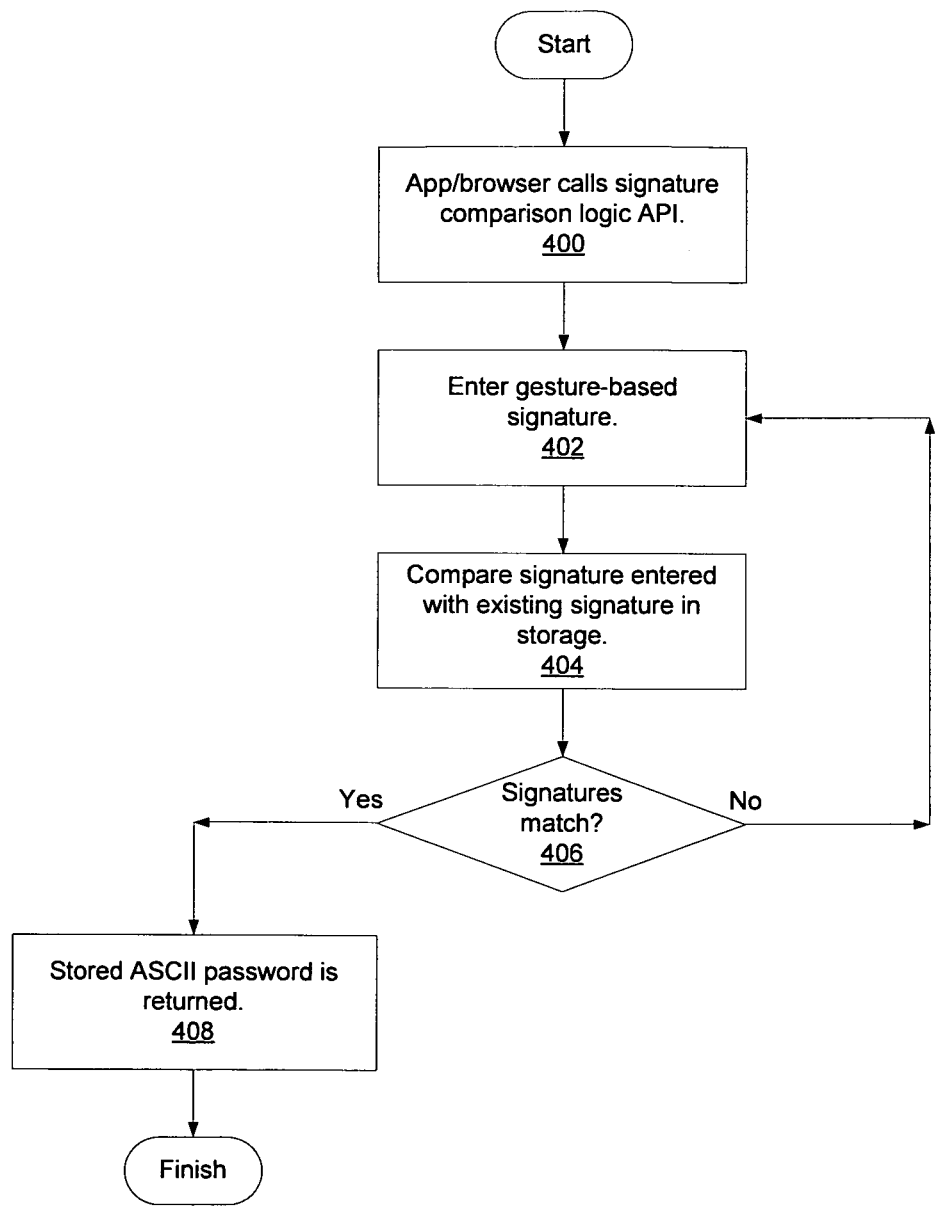
FIG. 4 is a flow diagram of an embodiment of a process to authenticate a gesture-based signature.

FIG. 4 is a flow diagram of an embodiment of a process to authenticate a gesture-based signature.

The process is performed by processing logic, which may comprise hardware (e.g., circuitry), software (e.g., an operating system or application), firmware (e.g., microcode), or any combination of two or more of the listed types of processing logic.

The process begins by processing logic in the application or web browser calling gesture-based signature comparison logic through the provided API (processing block 400). Then the user enters the gesture-based signature (processing block 402). Processing logic then compares the gesture-based signature that has been newly entered by the user with an existing registered signature in storage (processing block 404).

Processing logic then determines if the signatures match (processing block 406). If the signatures do not match, then the signature entry has failed and the process returns to block 402 to re-enter the gesture-based signature. Otherwise, if the signatures do result in a match, then processing logic returns the stored ASCII-based password to the application/browser for use (processing block 408) and the process is finished.

Figure 5:
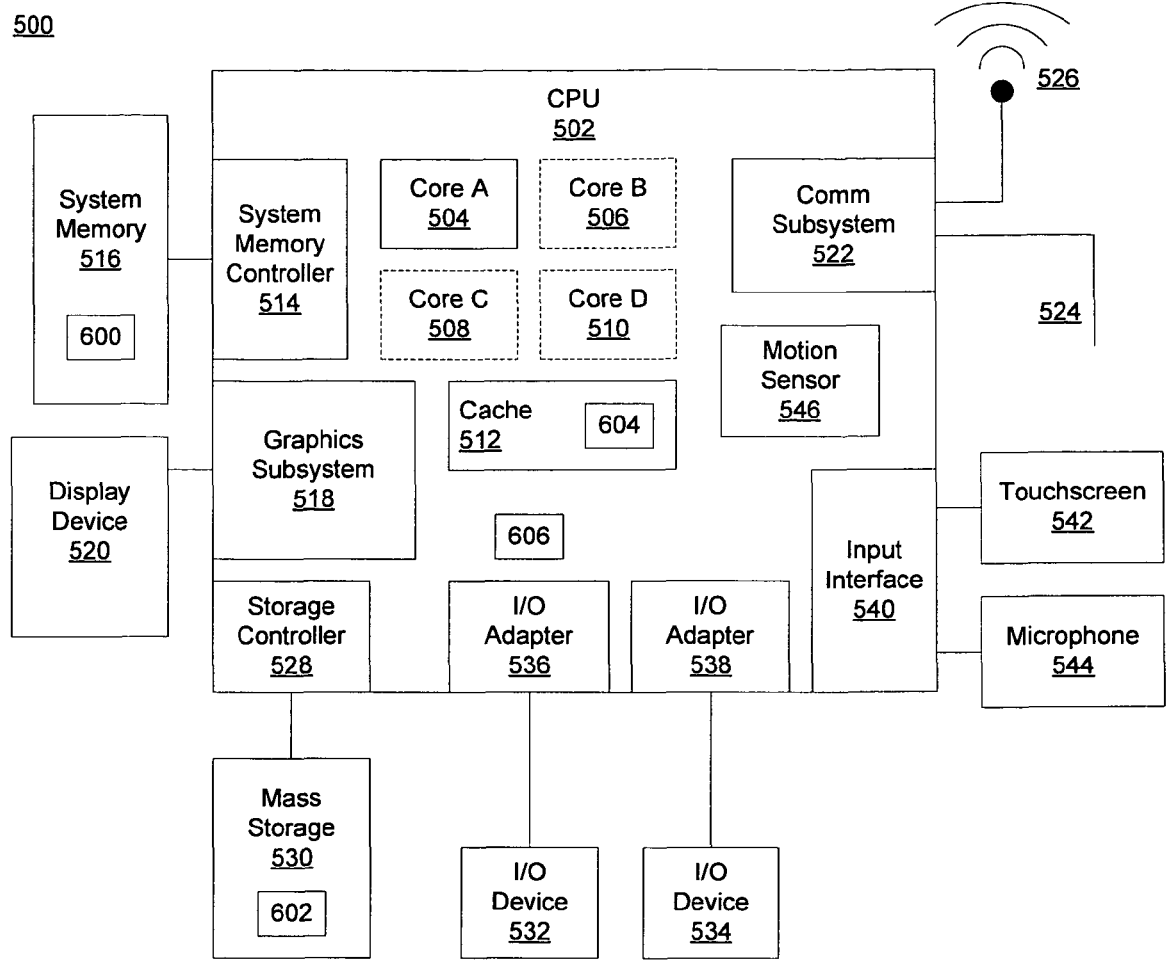
FIG. 5 illustrates an embodiment of a computing device that implements a gesture-based authentication process.

FIG. 5 illustrates an embodiment of a computing device that implements a gesture-based authentication process.

Computer system 500 is shown. The computer system in FIG. 5 generally comprises a system on a chip (SoC) layout. The SoC layout may be utilized in any type of computer system but is useful for small form factor mobile computing devices, such as cellular phones, smart phones, and personal digital assistants (PDAs).

The computer system 500 includes a central processing unit (CPU) 502. In a SoC layout, it is common to have a single CPU, though in other embodiments that are not shown, one or more additional CPUs are also located in computer system 500.

CPU 502 may be Intel® Corporation CPU or a CPU of another brand. CPU 502 includes one or more cores. In the embodiment shown, CPU 502 includes Core A (504), Core B (506), Core C (508), and Core D (510). Only one core is needed for operation of the computer system, but additional cores can distribute workloads and potentially increase overall system performance. In many embodiments, each core (such as core A (504)) includes internal functional blocks such as one or more execution units, retirement units, a set of general purpose and specific registers, etc. If the cores shown in FIG. 5 are multi-threaded or hyper-threaded, then each hardware thread may be considered as a core as well.

CPU 502 may also include one or more caches, such as last level cache (LLC) 512. In many embodiments that are not shown, additional caches other than cache 512 are implemented where multiple levels of cache exist between the execution units in each core and memory. In different embodiments cache 512 may be apportioned in different ways. Cache 512 may be one of many different sizes in different embodiments. For example, cache 512 may be an 8 megabyte (MB) cache, a 16 MB cache, etc. Additionally, in different embodiments the cache may be a direct mapped cache, a fully associative cache, a multi-way set-associative cache, or a cache with another type of mapping. The cache may include one large portion shared among all cores or may be divided into several separately functional slices (e.g., one slice for each core). Each cache may also include one portion shared among all cores and several other portions that are separate functional slices per core.

In many embodiments, CPU 502 includes a system memory controller 514 to provide an interface to communicate with system memory 516. System memory 516 may comprise dynamic random access memory (DRAM), such as a type of double data rate (DDR) DRAM, non-volatile memory such as flash memory, phase change memory (PCM), or another type of memory technology. System memory 516 may be a general purpose memory to store data and instructions to be operated upon by CPU 502. Additionally, there may be other potential devices within computer system 500 that have the capability to read and write to the system memories, such as a direct memory access (DMA)-capable I/O (input/output) device. The link (i.e., bus, interconnect, etc.) that couples CPU 502 with system memory 516 may include one or more optical, metal, or other wires (i.e. lines) that are capable of transporting data, address, control, and clock information.

CPU 502 also may include an integrated graphics subsystem 518, that is capable of computing pixel, vertex, and geometry data to be displayed on display device 520. CPU 502 additionally may include a communication subsystem 522 that provides an I/O interface to communicate with external devices. The communication subsystem 522 may include both wired 524 and wireless 526 interfaces. The wired interface 524 may be an Ethernet compatible interface, in some embodiments. The wireless interface 526 (through one or more antenna components for transmitting and receiving)

may be compatible for wireless communications through several protocols. For example, the communication subsystem 522 wireless interface 526 may communicate through an IEEE 802.11-based protocol, a Bluetooth protocol, a cellular protocol, a WiMAX protocol, and/or one or more other wireless protocols.

CPU 502 also includes a storage controller 528 to provide an interface to a mass storage device 530. Mass storage device 530 may be a hard disk drive, a solid state drive, or another form of mass storage. Additionally, CPU 502 also is capable of communicating to I/O devices, such as I/O device 532 and I/O device 534 through I/O adapters 536 and 538, respectively. The I/O adapters each may allow the CPU 502 to communicate with one or more I/O devices through a certain protocol. For example, one I/O adapter may be a Universal Serial Bus (USB) adapter to allow for plug in communication through USB ports between the CPU 502 and other external USB interfaces.

An input interface 540 allows the computer system 500 to be coupled to input devices such as a touchscreen 542 or microphone 544. Additionally, a motion sensor unit 546 is located on the system, which tracks the movement of computer system 500 in 3-dimensional space.

In many other embodiments that are not shown, the computing system may be implemented in a different way, such as in a standard CPU/chipset configuration instead of as a SoC design.

In many embodiments, gesture-based signature identification, comparison, and verification logic may be present in any one of the following locations. When at least a portion of the logic is implemented in software, the logic may be present in system memory 516 (logic 600), mass storage 530 (logic 602), cache 512 (logic 604), or potentially in any core (not shown). When at least a portion of the logic is implemented in hardware, the logic may be present in the general circuitry (uncore) of the CPU 502 outside of the cores (logic 606).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A method, comprising:
 recording a first gesture-based signature written on a touchscreen by a user, including coordinates associated with movement captured by the touchscreen;
 storing the recorded first gesture-based signature and a first duration of recording for the first gesture-based signature into a first storage location of a computing device;
 comparing the first gesture-based signature and the first duration with a second gesture-based signature and a second duration of recording for the second gesture-based signature already stored in a second storage location of the computing device; and
 verifying the first gesture-based signature as authentic if the first gesture-based signature and the first duration are substantially similar to the second gesture-based signature and the second duration respectively; and
 responsive to verifying that the first gesture-based signature is authentic, automatically substituting the verified first gesture-based signature for a stored correct text-based password that is then input into a password field, the stored correct text-based password stored in a storage of the computing device.

2. The method of claim 1, further comprising:
 registering the second gesture-based signature prior to recording the first gesture-based signature, wherein the registering comprises:
 recording the second gesture-based signature a plurality of times;
 calculating an acceptable variability range of the second gesture-based signature; and
 storing a version of the second gesture-based signature in the second storage location in response to the version at least falling within the calculated variability range.

3. The method of claim 1, further comprising:
 providing the stored correct text-based password in response to a password request if the first gesture-based signature has been verified as authentic.

4. The method of claim 1, wherein the verifying includes determining if the first duration is within a predetermined maximum discrepancy of time in comparison to the second duration, the second duration comprising the amount of time to fully record the second gesture-based signature.

5. The method of claim 4, wherein each of the first duration and the second duration include plural subset intervals of time, the verifying further includes comparing data recorded at the plural intervals of time associated with the first duration with corresponding data recorded at the plural intervals of time associated with the second gesture-based signature.

6. The method of claim 1, wherein the first gesture-based signature includes at least one of a touch-screen glyph, a spoken phrase, and a movement in three dimensional space.

7. A non-transitory machine-readable medium having stored thereon instructions, which if executed by a machine cause the machine to perform a method comprising:
   recording a first gesture-based signature written on a touch screen touchscreen by a user; storing the recorded first gesture-based signature into a first storage location of a computing device;
   comparing the first gesture-based signature with a second gesture-based signature already stored in a second storage location of the computing device, the second gesture-based signature associated with coordinates associated with movement captured by the touchscreen, one or more input values, and a corresponding acquisition time for each one or more input value;
   verifying the first gesture-based signature as authentic if the first gesture-based signature is substantially similar to the second gesture-based signature with respect to each of the one or more input values and the corresponding acquisition time for each one or more input value; and
   responsive to verifying that the first gesture-based signature is authentic, automatically substituting the verified first gesture-based signature for a stored correct text-based password that is then input into a password field, the stored correct text-based password stored in a storage of the computing device.

8. The machine-readable medium of claim 7, wherein the performed method further comprises:
   registering the second gesture-based signature prior to recording the first gesture-based signature, wherein the registering comprises:
      recording the second gesture-based signature a plurality of times;
      calculating an acceptable variability range of the second gesture-based signature; and
      storing a version of the second gesture-based signature in the second storage location in response to the version at least falling within the calculated variability range.

9. The machine-readable medium of claim 7, wherein the performed method further comprises:
   providing the stored correct text-based password in response to a password request when the first gesture-based signature has been verified as authentic.

10. The machine-readable medium of claim 7, wherein the verifying includes a relative temporal element that at least requires the first gesture-based signature to be fully recorded in a first period of time, the first period of time being within a predetermined maximum discrepancy of time in comparison to a second period of time, the second period of time comprising the amount of time to fully record the second gesture-based signature.

11. The machine-readable medium of claim 10, wherein the verifying further includes comparing data recorded at a plurality of acquisition times associated with the first gesture-based signature with corresponding input values recorded at the plurality of acquisition times associated with the second gesture based signature.

12. The machine-readable medium of claim 7, wherein the first gesture-based signature includes two or more of a touch-screen glyph, a spoken phrase, and a movement in three-dimensional space, each of the touch-screen glyph, spoken phrase, and movement in three-dimensional space associated with a separate buffer, each separate buffer utilized simultaneously to capture data corresponding to the first gesture-based signature.

13. A device, comprising:
   logic to:
   record a first gesture-based signature written on a touchscreen by a user, including coordinates associated with movement captured by the touchscreen;
   store the recorded first gesture-based signature into a first storage location of the device;
   compare the first gesture-based signature with a second gesture-based signature already stored in a second storage location of the device;
   verify the first gesture-based signature as authentic if the first gesture-based signature is substantially similar to the second gesture-based signature, substantial similarity based on comparing data recorded at a plurality of acquisition intervals and a time to fully record the first gesture-based signature with corresponding data recorded at the plurality of acquisition intervals and a time to fully record the second gesture-based signature; and
   responsive to verification that the first gesture-based signature is authentic, automatically substitute the verified first gesture-based signature for a stored correct text-based password that is then input into a password field, the stored correct text-based password stored in a storage of the device.

14. The device of claim 13, further comprising logic to:
   register the second gesture-based signature prior to recording the first gesture-based signature, the logic being further operable to:
      record the second gesture-based signature a plurality of times;
      calculate an acceptable variability range of the second gesture-based signature; and
      store a version of the second gesture-based signature in the second storage location in response to the version at least falling within the calculated variability range.

15. The device of claim 13, further comprising logic to:
   provide the stored correct text-based password in response to a password request when the first gesture-based signature has been verified as authentic.

16. The device of claim 13, wherein the logic is further operable to determine if the time to fully record the first gesture-based signature is within a predetermined maximum discrepancy of time in comparison to the time to fully record the second gesture-based signature.

17. The device of claim 13, wherein the first gesture-based signature includes at least two of a touch-screen glyph, a spoken phrase, and a movement in three-dimensional space.

18. A system comprising:
   a processor;
   a motion sensor;
   a memory coupled to the processor, the memory to include a glyph capture buffer, a three-dimensional movement capture buffer, and an audio capture buffer;
   a dynamic random access memory coupled to the processor, the dynamic random access memory to store a set of instructions, which if executed by the processor causes the processor to perform a method comprising:
      recording a first gesture-based signature written on a touchscreen by a user, including coordinates associated with movement captured by the touchscreen, in one or more of the glyph capture buffer, the three-dimensional movement capture buffer, and the audio capture buffer during a gesture capture period, each capture buffer to align by an acquisition time at a start of the gesture capture period;

storing the recorded first gesture-based signature into a first storage location;

comparing the first gesture-based signature with a second gesture-based signature already stored in a second storage location;

verifying the first gesture-based signature as authentic when the first gesture- based signature is substantially similar to the second gesture-based signature; and responsive to verifying that the first gesture-based signature is authentic, automatically substituting the verified first gesture-based signature for a stored correct text-based password that is then input into a password field, the stored correct text-based password stored in a storage.

19. The system of claim 18, wherein the performed method further comprises:

registering the second gesture-based signature prior to recording the first gesture-based signature, wherein the registering comprises:

recording the second gesture-based signature a plurality of times;

calculating an acceptable variability range of the second gesture-based signature; and storing a version of the second gesture-based signature in the second storage location in response to the version at least falling within the calculated variability range.

20. The system of claim 18, wherein the performed method further comprises:

providing the stored correct text-based password in response to a password request when the first gesture-based signature has been verified as authentic.

21. The system of claim 18, wherein the verifying includes a relative temporal element that at least requires the first gesture-based signature to be fully recorded in a first period of time, the first period of time being within a predetermined maximum discrepancy of time in comparison to a second period of time, the second period of time comprising the amount of time to fully record the second gesture-based signature.

22. The system of claim 21, wherein the verifying further includes comparing data recorded at a plurality of intervals of time associated with the first gesture-based signature with corresponding data recorded at the plurality of intervals of time associated with the second gesture-based signature.

23. The system of claim 18, wherein the first gesture-based signature includes at least one of a touch-screen glyph, a spoken phrase, and a movement in three dimensional space.

\* \* \* \* \*